United States Patent [19]
Jansson

[11] Patent Number: 6,109,143
[45] Date of Patent: Aug. 29, 2000

[54] PLIERS WITH S-SHAPED RETURN SPRING

[75] Inventor: Conny Jansson, Västerås, Sweden

[73] Assignee: Kapman AB, Sandviken, Sweden

[21] Appl. No.: 09/393,708

[22] Filed: Sep. 10, 1999

[30]  Foreign Application Priority Data

Sep. 11, 1998 [SE] Sweden ................................ 9803077

[51] Int. Cl.$^7$ ...................................................... B25B 7/02
[52] U.S. Cl. ................................................. 81/427; 81/417
[58] Field of Search ........................... 81/427, 417, 379,
 81/357, 380, 321, 322, 323; 30/261

[56]     References Cited

U.S. PATENT DOCUMENTS 2,676,404  4/1954  Peckron et al. ........................... 30/261
4,739,552  4/1988  Thomas ....................................... 30/28
4,810,019  3/1989  Smolen, Jr. .
5,619,892  4/1997  Eggert ....................................... 81/417

FOREIGN PATENT DOCUMENTS 506068  11/1997  Sweden .

Primary Examiner—Timothy V. Eley
Assistant Examiner—Dung Van Nguyen
Attorney, Agent, or Firm—Burns, Doane, Swecker & Mathis, L.L.P.

[57]     ABSTRACT

A pliers type tool includes two pivoted handle shanks between an S-shaped return spring is attached. The spring is made from a fiber-reinforced polymer and has a greater thickness at the center than at the ends. The width of the spring is gradually reduced from one end to the other. The center is disposed farther from one end than from the other end when the spring is relaxed.

10 Claims, 1 Drawing Sheet

PLIERS WITH S-SHAPED RETURN SPRING

BACKGROUND OF THE INVENTION

The present invention relates to a pliers type tool having an S-shaped return spring.

In several kinds of tools, such as pliers, return springs are used to bias the tool to an open state. It has, however, been shown that repeated use of the tool is less exhausting if the spring force does not increase linearly when the tool is closed, but is instead relatively constant or slowly diminishing, and for this purpose S-shaped springs are suitable. S-shaped springs are described in U.S. Pat. No. 4,801,019 and Swedish Patent 506 068. An adjustment of the spring force to the operator's wishes is then possible by locating the ends of the spring in various positions along the handles of the pliers.

Simple S-shaped springs with constant cross-section have some disadvantages, however, due to a strongly diminishing force when the deformation increases, and to an unstable position for a strongly compressed spring, allowing it to snap between two equilibrium positions where the curvature is stronger at one end or the other. With such springs, it may be necessary to use especially stiff connections to the handles of the pliers, such as keyhole shaped, as mentioned in U.S. Pat. No. 4,801,019.

The present invention concerns a spring with a more constant force and with a stable equilibrium position which does not deform the connections to the handles, and which makes it easier to handle small delicate items.

SUMMARY OF THE INVENTION

In accordance with the present invention a pliers includes a pair of handle shanks pivoted together, and a return spring for biasing the handle shanks apart. The spring is S-shaped in a relaxed state. A thickness of the spring is greatest at its center portion and smallest at its end portions. The center of the spring is located farther from a first end of the spring than from a second end of the spring.

Preferably, a width of one end of the spring is greater than the width of the center of the spring. The other end of the spring preferably has a smaller width than the center of the spring. Most preferably, the spring has a gradually reduced width from one end to the other.

BRIEF DESCRIPTION OF THE DRAWINGS

The objects and advantages of the invention will become apparent from the following detailed description of a preferred embodiment thereof in connection with the accompanying drawing in which like numerals designate like elements, and in which.

DETAILED DESCRIPTION OF A PREFERRED EMBODIMENTS OF THE INVENTION

Figure 1:
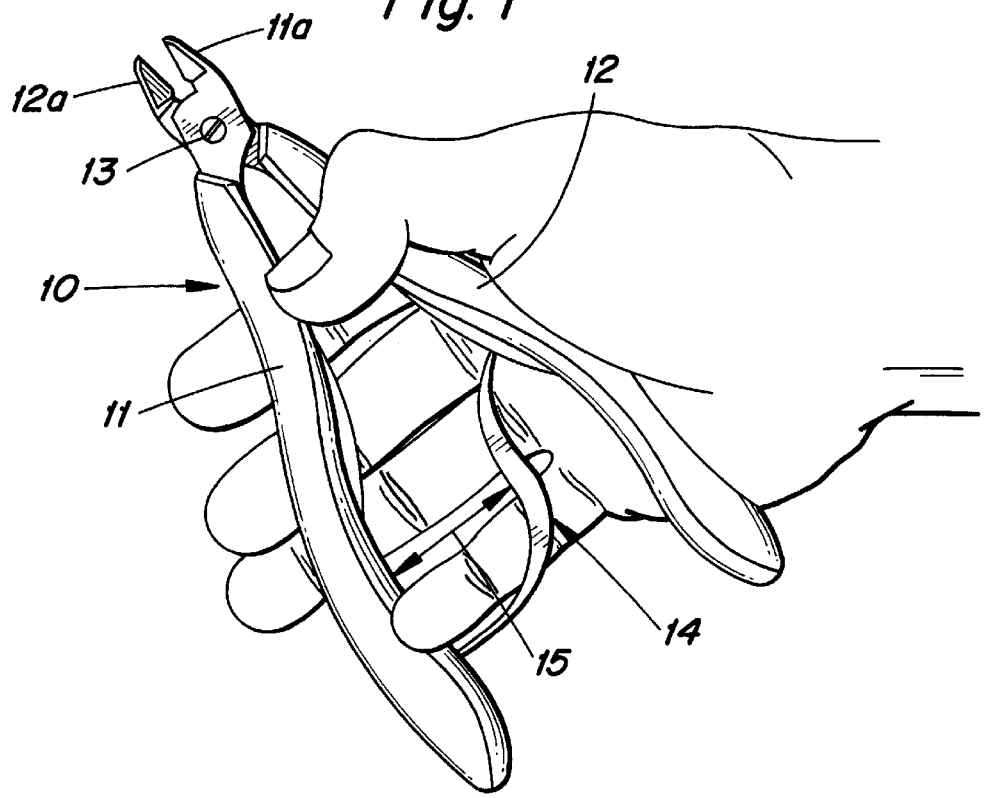
FIG. 1 shows a pliers with an S-shaped return spring according to the invention.

A pliers (10) with an S-shaped return spring (14) is shown in FIG. 1, and comprises two handle shanks (11, 12) connected at a joint (13). The shanks (11, 12) include respective working ends (11a, 12a). Between the shanks the S-shaped return spring (14) is located, which will open the pliers when the operator reduces the force of his fingers on the handles of the pliers. When holding small or delicate items in electronics or medical applications, it is important that the force needed to counteract the return spring be small, fairly constant and uniquely defined, so that a change of equilibrium position of the spring does not cause dropping or deforming of the item. The spring should be such that the force of the fingers is noticeable already at beginning of the closing of the pliers, but hardly increasing subsequently. Of course, since the direction of the spring force changes when the handles are squeezed, it is acceptable for the spring force to increase slightly.

Figure 3:
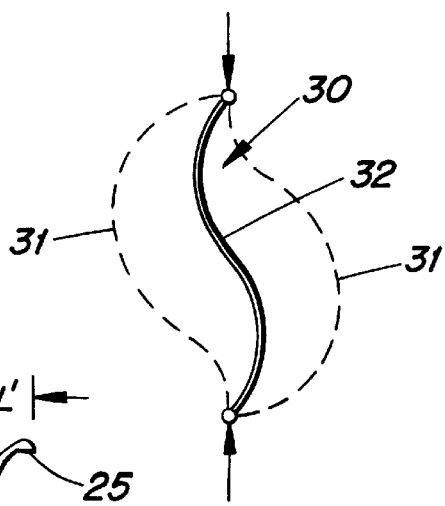
FIG. 3 shows a prior art return spring with constant cross-section, the spring depicted at rest (solid lines) and strongly compressed (dashed lines)

A prior art simple S-shaped spring (30) with constant cross-section (FIG. 3), such as made from a bent metal strip, has a spring force which first increases sharply with increasing deformation, then reaches a flat maximum and finally decreases sharply. When the spring force decreases, the shape of the spring becomes unstable as shown in dashed lines in FIG. 3, with the central part tending to leave the symmetry line defined by the at-rest spring, to make the spring look like either a normal or reversed J (31) instead of the symmetric S-shape (32). If this occurs when the pliers is being used, the spring may suddenly snap against the user's fingers, pressing them against the handle part of the shank. To prevent this, the distance (15) between the central part of the spring and the shank should be kept relatively constant. The instability may also cause a sudden decrease of the spring force, letting a greater part of the finger force act on the item being held, which may damage fragile items. In such cases, it may be desirable to attach the ends of the spring to the shanks against angular mobility by means of keyhole-shaped slots as shown in Swedish Patent 506 068.

Such slots are difficult to make with sufficient precision, and they make it difficult to relocate the spring to adjust the force to individual preferences. The present invention concerns an S-shaped spring having a non-uniform cross-section which ensures positional stability and corresponding reduced risk of snapping against the fingers, simpler adjustment of the force, simpler manufacture of the attachment slots and less risk of damage to small delicate items.

Figure 2:
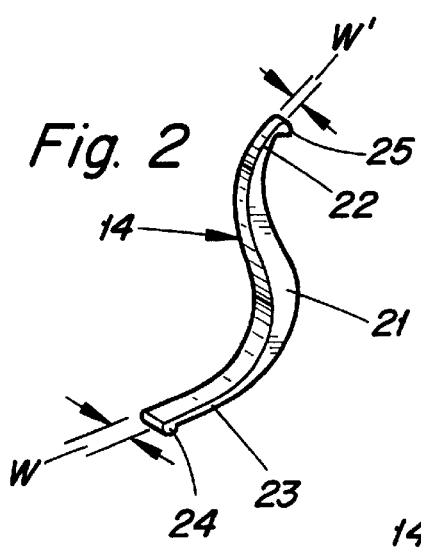
FIG. 2 shows a perspective view of the S-shaped spring at rest.

To avoid instability, the cross-section, as shown in FIG. 2 has a greater thickness T in the central portion (21), and becoming gradually thinner towards the end portions (22, 23). A typical thickness would be 1.8 mm at the center, reduced to 1.25 mm at the ends. A spring with such a thickness variation will have a stable equilibrium even when strongly compressed.

As noted above, a prior art spring with uniform cross-section may lose stability by deforming out of the original bending plane or symmetry line. If used in a pliers, this implies a risk of the spring becoming detached from the handles and flying off. A spring according to the invention is preferably made with a larger width W at the spring center portion than at least at one spring end (24). That end (24) would be mated with a corresponding wider slot in one shank. The wide end (24) is located farther from the pivot 13 than is the center of the spring. Preferably the other end (25) is of reduced width W', relative to the center of the spring. In fact, the width of the spring is gradually reduced from the end (24) to the end (25).

Figure 4:
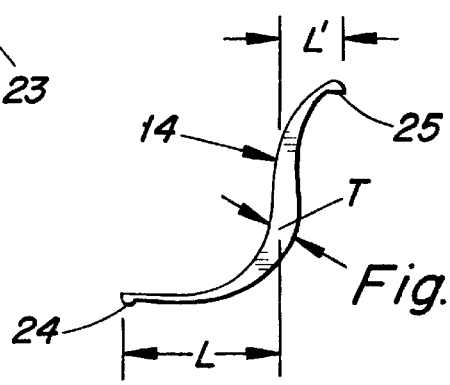
FIG. 4 is a side elevational view of the spring of FIG. 2.

A spring with a thicker central portion and a corresponding stable deformation can be made to deviate to one preferred side by making a first curved portion (23) longer than a second curved portion (22). That is, the center is located farther from the first end (24) than from the second end (25), i.e., L>L' in FIG. 4. The deformation of the spring can then be matched to the shape of the handle shank (11) so that the increased bending of the first curved portion (23) when the pliers is closed will leave a basically constant distance (15) between the central portion (21) and the first handle shank (11) with enough room for the insertion of a finger.

If the first curved portion (23) keeps a basically constant angular relationship to the first shank (11), then the second curved portion (22) must change its angle relative to the second handle shank (12). The second curved portion (22) may then preferably be provided with a claw (25) which will grip the shank when the pliers is open and the force small, to avoid being pulled out of the slot in the shank. When the pliers is closed, the spring force creates enough friction to keep the spring in the slot, but the claw (25) is then inactive, and the spring can be pushed to the side by hand for exchanging or relocating. The first end (24) is shaped as a curved bead.

A spring according to the invention with non-uniform cross-section can be made from many different materials, metallic as well as non-metallic. Because of the complicated shape, however, it is preferred to make the spring from a fiber reinforced polymer.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A pliers comprising:

a pair of handle shanks pivoted together by a pivot, and a return spring for biasing the handle shanks apart, the spring being S-shaped in a relaxed state and having first and second end portions, a thickness of the spring gradually increasing from each of its first and second end portions to its center portion, the center portion being situated farther from the first end portion of the relaxed spring than from the second end portion of the spring.

2. The pliers according to claim 1 wherein the first end portion of the spring is situated farther from the pivot than is the center portion of the spring, the second end portion being situated closer to the pivot than is the center portion of the spring.

3. The pliers according to claim 2 wherein the first end portion is of greater width than the center portion of the spring.

4. The pliers according to claim 3 wherein the second end portion is of less width than the center portion.

5. The pliers according to claim 2 wherein a width of the spring is gradually reduced from the first end portion to the second end portion.

6. The pliers according to claim 1 wherein the second end portion is generally claw-shaped.

7. The pliers according to claim 6 wherein the first end portion is shaped as a curved head.

8. The pliers according to claim 1 wherein one end portion of the spring is of greater width than the center portion of the spring.

9. The pliers according to claim 8 wherein the other end portion of the spring is of less width than the center portion.

10. The pliers according to claim 9 wherein the width of the spring is gradually reduced from the one end portion to the other end portion.

* * * * *